(12) United States Patent
Zhu et al.

(10) Patent No.: US 10,594,005 B2
(45) Date of Patent: *Mar. 17, 2020

(54) ELECTRICAL STORAGE DEVICE HEATER FOR VEHICLE

(71) Applicant: Ford Global Technologies, LLC, Dearborn, MI (US)

(72) Inventors: Douglas X. Zhu, Chandler, AZ (US); Jacob Mathews, Canton, MI (US); Patrick Daniel Maguire, Ann Arbor, MI (US); Patrick L. Padgett, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1231 days.

This patent is subject to a terminal disclaimer.

(21) Appl. No.: 14/041,243

(22) Filed: Sep. 30, 2013

(65) Prior Publication Data
US 2014/0037998 A1 Feb. 6, 2014

Related U.S. Application Data

(63) Continuation of application No. 13/115,564, filed on May 25, 2011, now Pat. No. 8,569,656, which is a (Continued)

(51) Int. Cl.
*B60L 1/02* (2006.01)
*H05B 3/00* (2006.01)
(Continued)

(52) U.S. Cl.
CPC .............. *H01M 10/63* (2015.04); *B60L 58/24* (2019.02); *B60L 58/27* (2019.02); (Continued)

(58) Field of Classification Search
CPC ................ B60L 11/187; B60L 11/1875; B60L 11/1818; B60L 2210/30; F02N 2200/064; (Continued)

(56) References Cited

U.S. PATENT DOCUMENTS 3,469,072 A 9/1969 Carlson
3,623,916 A 11/1971 Toyooka et al.
(Continued)

FOREIGN PATENT DOCUMENTS

DE 10216906 11/2003
EP 0902348 3/1999

OTHER PUBLICATIONS

Patent Act 1977: Search Report under Section 17 for Application No. GB0514457.1 dated Sep. 14, 2005.

*Primary Examiner* — Sang Y Paik
(74) *Attorney, Agent, or Firm* — David B. Kelley; Carlson, Gaskey & Olds

(57) ABSTRACT

An electrical storage device heater system according to an exemplary aspect of the present disclosure includes, among other things, an electrical storage device, a heater configured to regulate a temperature of the electrical storage device and a controller configured to actuate the heater using power sourced from a location separate from the electrical storage device.

16 Claims, 4 Drawing Sheets

Related U.S. Application Data continuation of application No. 10/897,695, filed on Jul. 23, 2004, now abandoned.

(51) Int. Cl.

| | | |
|---|---|---|
| *H01M 10/63* | (2014.01) | |
| *F02N 19/02* | (2010.01) | |
| *F02N 11/08* | (2006.01) | |
| *H01M 10/615* | (2014.01) | |
| *B60L 58/24* | (2019.01) | |
| *B60L 58/27* | (2019.01) | |
| *B60K 6/28* | (2007.10) | |
| *F02N 11/14* | (2006.01) | |
| *B60K 1/00* | (2006.01) | |

(52) U.S. Cl.
CPC .......... *F02N 11/0862* (2013.01); *F02N 19/02* (2013.01); *H01M 10/615* (2015.04); *B60K 6/28* (2013.01); *B60K 2001/008* (2013.01); *B60L 2210/30* (2013.01); *B60W 2510/246* (2013.01); *F02N 11/0866* (2013.01); *F02N 11/14* (2013.01); *F02N 2200/064* (2013.01); *Y02T 10/7005* (2013.01); *Y02T 10/705* (2013.01); *Y02T 10/7241* (2013.01)

(58) Field of Classification Search
CPC .. F02N 11/0862; F02N 11/0866; F02N 11/14; F02N 19/02; H05B 1/02; H05B 1/0202; H05B 1/0225; H05B 1/0236; H01B 3/00; B60K 2001/008; B60K 6/28; B60W 2510/246; H01M 10/5006; H01M 10/615; H01M 10/63; Y02T 10/7005; Y02T 10/705; Y02T 10/7241
USPC .................................................. 219/201–205
See application file for complete search history.

(56) References Cited

U.S. PATENT DOCUMENTS

| | | | |
|---|---|---|---|
| 3,649,366 A | 3/1972 | Jordan et al. | |
| 3,798,072 A * | 3/1974 | Anderson | 123/142.5 E |
| 4,081,737 A | 3/1978 | Miyahara | |
| 4,667,140 A | 5/1987 | Sweetman | |
| 5,055,656 A | 10/1991 | Farah et al. | |
| 5,115,116 A * | 5/1992 | Reed | B60R 16/04 |
| | | | 219/202 |
| 5,280,158 A | 1/1994 | Matava et al. | |
| 5,281,792 A | 1/1994 | Lee et al. | |
| 5,356,735 A | 10/1994 | Meadows et al. | |
| 5,362,942 A | 11/1994 | Vanderslice, Jr. et al. | |
| 5,508,126 A | 4/1996 | Braun | |
| 5,710,507 A | 1/1998 | Rosenbluth et al. | |
| 5,731,568 A | 3/1998 | Malecek | |
| 5,834,131 A | 11/1998 | Lutz et al. | |
| 5,871,859 A | 2/1999 | Parise | |
| 5,948,298 A | 9/1999 | Ijaz | |
| 5,985,480 A | 11/1999 | Sato et al. | |
| 5,994,669 A | 11/1999 | McCall | |
| 6,002,240 A | 12/1999 | McMahan et al. | |
| 6,057,050 A | 5/2000 | Parise | |
| 6,183,855 B1 * | 2/2001 | Buckley | A41D 31/0038 |
| | | | 165/104.11 |
| 6,668,963 B2 * | 12/2003 | Nada | 180/279 |
| 7,097,934 B2 | 8/2006 | Shigeta et al. | |
| 8,569,656 B2 * | 10/2013 | Zhu et al. | 219/205 |
| 2003/0140880 A1 * | 7/2003 | Kahlon | B60K 6/485 |
| | | | 123/179.3 |
| 2003/0155344 A1 * | 8/2003 | Cobb | B01L 3/50851 |
| | | | 219/428 |
| 2003/0169018 A1 * | 9/2003 | Berels | H02J 1/14 |
| | | | 320/132 |
| 2005/0064278 A1 | 3/2005 | Fetcenko et al. | |

\* cited by examiner

ELECTRICAL STORAGE DEVICE HEATER FOR VEHICLE

CROSS REFERENCE TO RELATED APPLICATIONS

This application is a continuation of U.S. patent application Ser. No. 13/115,564, filed on May 25, 2011, which is a continuation of U.S. patent application Ser. No. 10/897,695, filed on Jul. 23, 2004.

TECHNICAL FIELD AND BACKGROUND

This disclosure relates generally to thermal controls for an electrical storage device in a vehicle. More particularly, the present disclosure relates to a system and method for heating the electrical storage device.

Electric and hybrid electric vehicles have become increasingly popular to meet the demand for fuel-efficient, environmentally-friendly transportation. Such vehicles often include an electrical storage device, such as a high-voltage traction battery, for powering an electric motor to drive the vehicle, either alone or in conjunction with an internal combustion engine, fuel cell engine, or other prime mover.

Currently available electric and hybrid electric vehicles tend to operate more effectively in moderate and warm climates and less effectively in extremely cold climates. This is because high voltage traction batteries tend to lose power as battery cell temperature drops (e.g., below approx. 20° C.). This power decrease results in reduced vehicle performance, fuel economy and drivability. At extremely low temperatures, the traction battery may have insufficient power to even start the vehicle.

Maintaining a proper battery temperature is desirable to ensure optimal vehicle performance in many different climates. Sustaining the battery temperature at a desired level can be challenging because the battery temperature can be affected by many factors, such as the battery condition, the battery cell temperature, the battery charge condition when the vehicle is turned off, and the ambient temperature. Self-powered battery heaters are able to maintain a minimum battery temperature level only for short time periods because the amount of power available for heating is limited by the storage capacity of the battery itself. Thus, self-powered battery heaters are unsuitable when the battery needs to be heated for an extended time period and/or when the battery needs to be warmed to a higher temperature to ensure optimal vehicle performance.

As such, there is a need for a system that can maintain a battery temperature to a level that ensures reliable starting of an electric or hybrid vehicle. There is also a need for a system that can maintain a proper battery temperature in a controlled manner to ensure optimum vehicle performance.

SUMMARY

An electrical storage device heater system according to an exemplary aspect of the present disclosure includes, among other things, an electrical storage device, a heater configured to regulate a temperature of the electrical storage device and a controller configured to actuate the heater using power sourced from a location separate from the electrical storage device.

In a further non-limiting embodiment of the foregoing system, the electrical storage device is a battery cell.

In a further non-limiting embodiment of either of the foregoing systems, the electrical storage device is an ultracapacitor.

In a further non-limiting embodiment of any of the foregoing systems, a converter is connected between an external power source and the electrical storage device.

In a further non-limiting embodiment of any of the foregoing systems, the controller controls operation of the heater between an OFF and an ON condition.

In a further non-limiting embodiment of any of the foregoing systems, the controller is configured to actuate a switch to couple or decouple an external power source to the electrical storage device.

In a further non-limiting embodiment of any of the foregoing systems, the controller is powered by a power source separate from the external power source.

In a further non-limiting embodiment of any of the foregoing systems, the external power source includes a battery located on-board of a vehicle.

In a further non-limiting embodiment of any of the foregoing systems, the external power source is completely remote from the electrical storage device.

In a further non-limiting embodiment of any of the foregoing systems, a connector is configured to connect the heater to the external power source.

A vehicle according to an exemplary aspect of the present disclosure includes, among other things, an external power source located on-board of the vehicle and a battery system powered by the external power source. The battery system includes an electrical storage device, a heater that selectively heats the electrical storage device, and a switch that selectively couples the heater to the external power source. A controller controls the operation of the heater by actuating the switch to couple the heater to the external power source.

In a further non-limiting embodiment of the foregoing vehicle, the controller is powered by an alternative power source that is separate from the external power source.

In a further non-limiting embodiment of either of the foregoing vehicles, the controller is configured to actuate the switch based on at least one of a temperature of the electrical storage device, an output from a converter, and/or a key on/off condition of the vehicle.

In a further non-limiting embodiment of any of the foregoing vehicles, an engine block heater is coupled to the battery system by the external power source.

In a further non-limiting embodiment of any of the foregoing vehicles, the external power source is a supplemental electrical power source on-board the vehicle.

A method according to another exemplary aspect of the present disclosure includes, among other things, checking whether a battery system is connected to an external power source, checking a temperature of an electrical storage device of the battery system, connecting a heater to the electrical storage device if the temperature is below a temperature threshold, and disconnecting the heater from the electrical storage device if the temperature is above the temperature threshold or if the battery system is disconnected from the external power source.

In a further non-limiting embodiment of the foregoing method, the method includes checking whether a vehicle is in a key ON or key OFF condition prior to the step of checking whether the battery system is connected to the external power source.

In a further non-limiting embodiment of either of the foregoing methods, the method includes periodically awakening from a sleep mode to re-check the temperature of the electrical storage device.

In a further non-limiting embodiment of any of the foregoing methods, the method includes remaining in the sleep mode for a selected time period, awakening from the sleep mode after the selected time period, and rechecking whether the battery system is connected to the external power source after the step of awakening from the sleep mode.

In a further non-limiting embodiment of any of the foregoing methods, the method of connecting includes closing a switch and the step of disconnecting includes opening the switch.

These and other features of the present invention can be best understood from the following specification and drawings, the following of which is a brief description.

DETAILED DESCRIPTION

Figure 1:
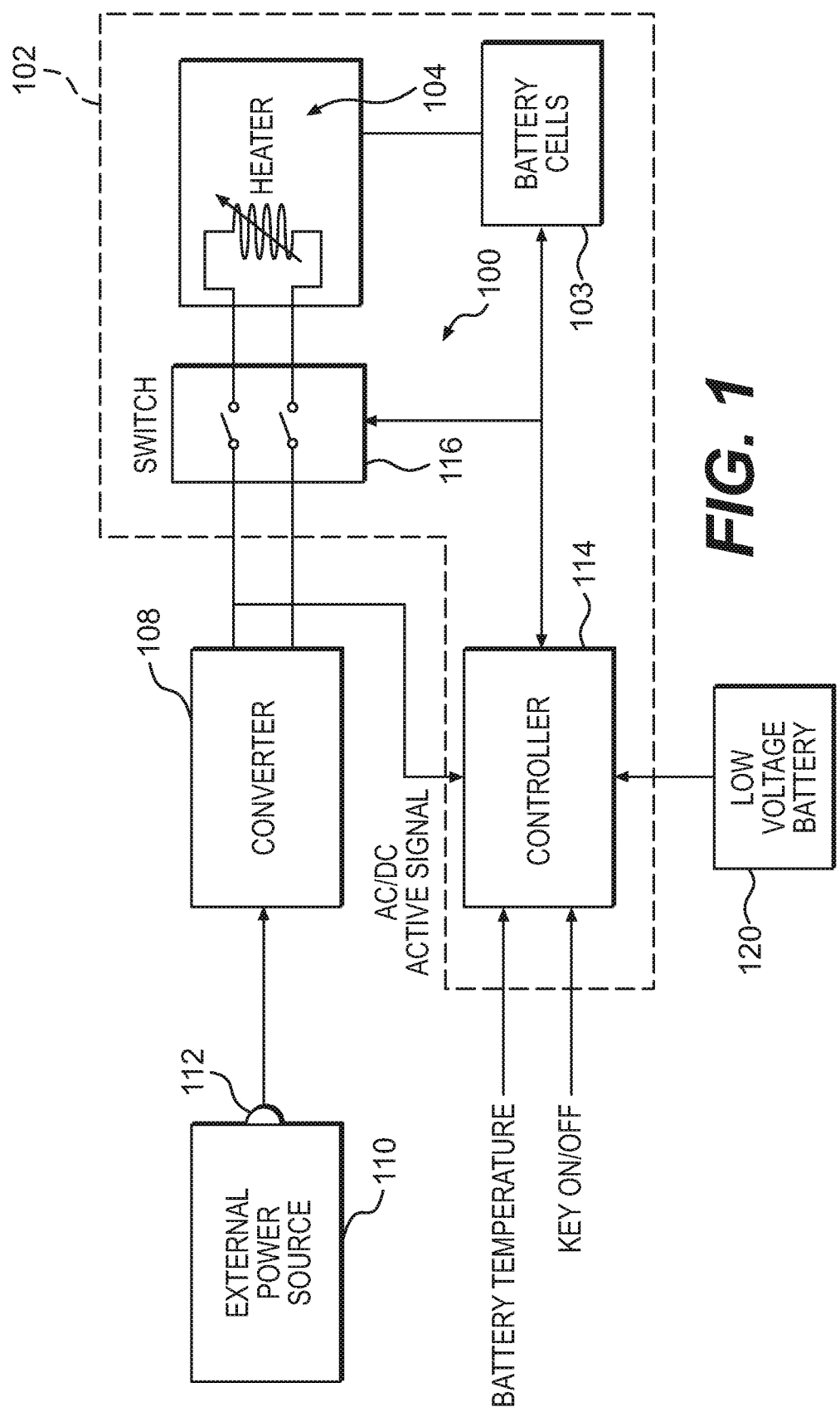
FIG. 1 is a block diagram illustrating a battery heater system according to one embodiment of the invention.

FIG. 1 is a block diagram illustrating components of a battery heater system 100 according to one embodiment of the invention. Generally, the invention is directed to a vehicle battery heater system 100 that is powered by an external power source e.g., a 120V AC power source outside the vehicle or a supplemental low-voltage or accessory battery on-board the vehicle) outside a high-voltage battery system 102 or other electrical storage device. The battery system 102 includes one or more battery cells 103. By using an external power source that is separate from the high-voltage battery system 102 to operate the heater system 100, the invention can keep the battery system 102 warm and regulate the temperature of the battery system 102 reliably when the vehicle is exposed to a cold environment.

As shown in FIG. 1, the battery heater system 100 includes a heater 104 for warming the battery cells 103. The heater 104 itself may have any configuration known and appreciated in the art that is appropriate for regulating the temperature of the battery cells 103. In one embodiment, a plurality of resistive or other thermoelectric heater elements disposed in the battery system 102 act as the heater 104. The heater 104 is coupled to the battery cells 103. The battery cells 103 themselves can be, for example, nickel metal hydride cells, lithium-ion cells, lead acid cells, or any equivalent electric energy storage device. Although the description below focuses on battery cells, the heater system may apply to other electrical storage devices, such as ultra-capacitors, without departing from the scope of the invention.

The heater system 100 also includes a converter 108. In the example shown in FIG. 1, the converter 108 is an AC/DC converter that converts an AC voltage output from an external AC power source 110 to a lower level DC voltage output. The AC power source 110 can be, for example, power from a wall outlet in a garage. A connector 112, such as a conventional three-pronged plug, connects the battery heater system 100 to the AC power source 110. The output of the AC/DC converter 108 or a suitable control signal may also be sent to a controller 114 that controls operation of the heater 104 via one or more switches 116, such as relays, mechanical switches, field effect transistors, etc. In one embodiment, the controller 114 also receives signals indicating a battery temperature, a key on/off condition (e.g., whether a key is in the vehicle ignition), and an AC/DC active signal as inputs and controls operation of the switch 116 based on these inputs.

Alternatively, the controller 114 may be powered by, for example, a separate low-voltage battery 120 or other alternative power source. The low-voltage battery 120 may be, for example, a conventional accessory battery having a nominal voltage output of approximately 10V-15V. If the controller 114 is powered by the low-voltage battery 120, the controller 114 can monitor the temperature of the battery system 102 even when the battery heater system 100 is not connected to the AC power source 110. The controller 114 preferably draws a very small current during operation (e.g., on the order of less than 1 mA). Moreover, by intermittently placing the controller 114 into a sleep mode where it draws minimal current, as will be described in greater below, the controller 114 avoids draining the low-voltage battery 120. The components of the heater system 100 may be connected together via any connection structure, such as an electrical harness (not shown).

Figure 2:
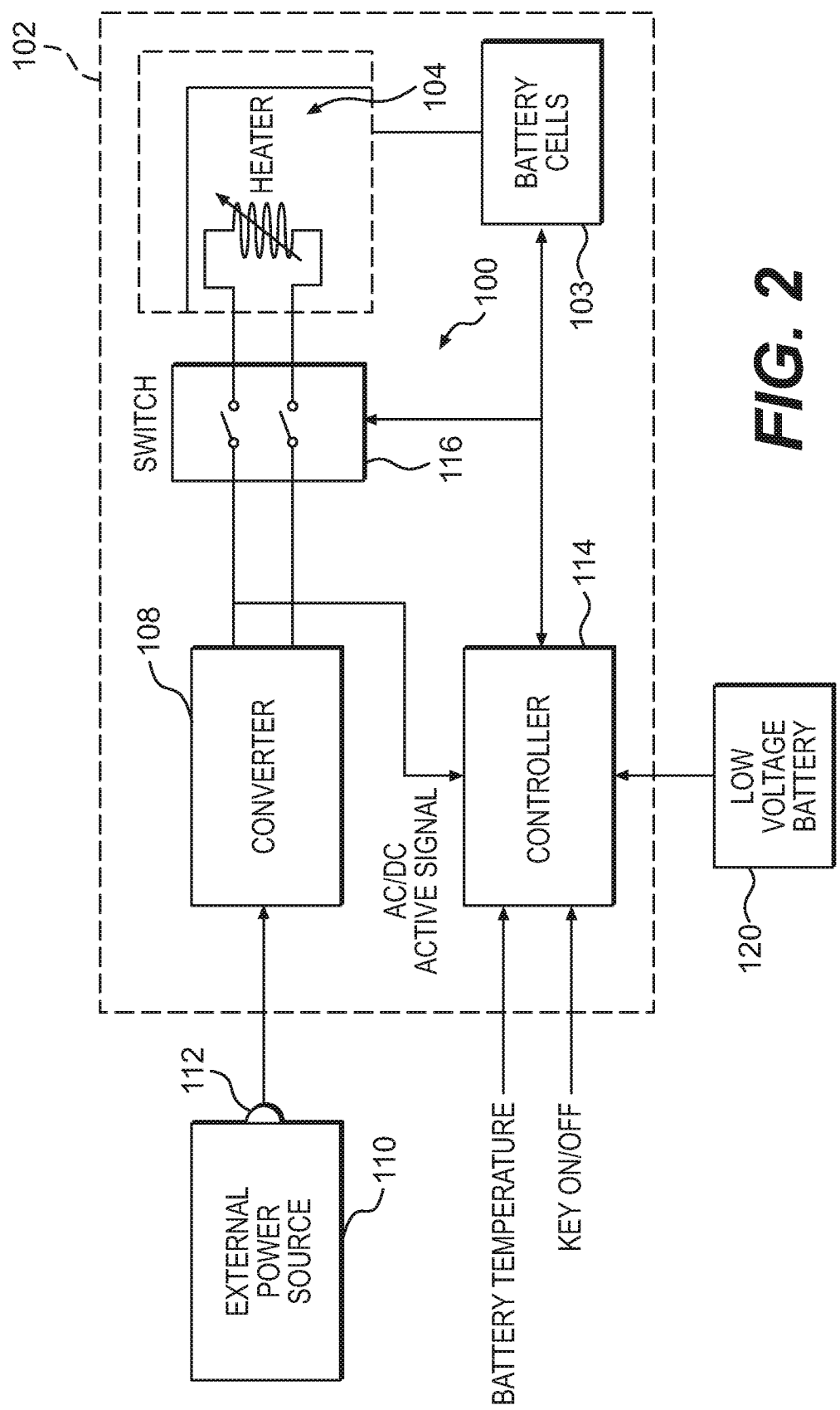
FIG. 2 is a block diagram illustrating a battery heater system according to another embodiment of the invention.

In the example shown in FIG. 1, the controller 114 and the switches 116 are disposed in the battery system 102, while the AC/DC converter 108 may be placed at any location in the vehicle outside the battery system 102. The AC/DC converter 108 tends to be an expensive component; by placing the AC/DC converter 108 outside of the battery system 102, the battery heater system 100 can be marketed as a separate component as part of a vehicle heating package and can be omitted in vehicles that do not require cold weather assistance. Note that other components in the system (e.g., the controller 114 and/or the switch 116) may be placed outside the battery system 102 as well, if desired, to further enhance modularity by placing these components only in vehicles that require it. FIG. 2 illustrates another embodiment of the battery heater system 100 where both the AC/DC converter 108 and the controller 114 are disposed outside the battery system 102.

Moreover, by placing the AC/DC converter 108 outside the battery system 102 (e.g., near a vehicle engine), only low voltage DC electrical lines, as opposed to high voltage AC lines, need to be passed through a passenger compartment of the vehicle, eliminating possible safety concerns. Keeping the AC/DC converter 108 separate from the battery system 102 makes UL certification simpler because certification is needed only for the AC/DC converter 108, as opposed to the entire battery system 102 if the AC/DC converter 108 were included within the battery system 102.

Connecting the battery heater system 100 to the AC power source 110 allows the battery system 102 to be heated for an unlimited time period as long as the connection lasts. This creates a distinct advantage over self-powered battery heaters, which can heat the battery only for a finite time period. Also, the unlimited nature of the AC power source 110 allows the battery system 102 to be heated to a higher temperature without risking power supply drainage, making it possible to maintain the battery temperature to a level that allows the vehicle to start. In another embodiment, the temperature level may be selected to ensure optimum battery performance.

Note that if the supplemental battery is used as the external power source, the converter 108 may be a DC/DC converter. Of course, the converter 108 may also be omitted altogether.

Figure 3:
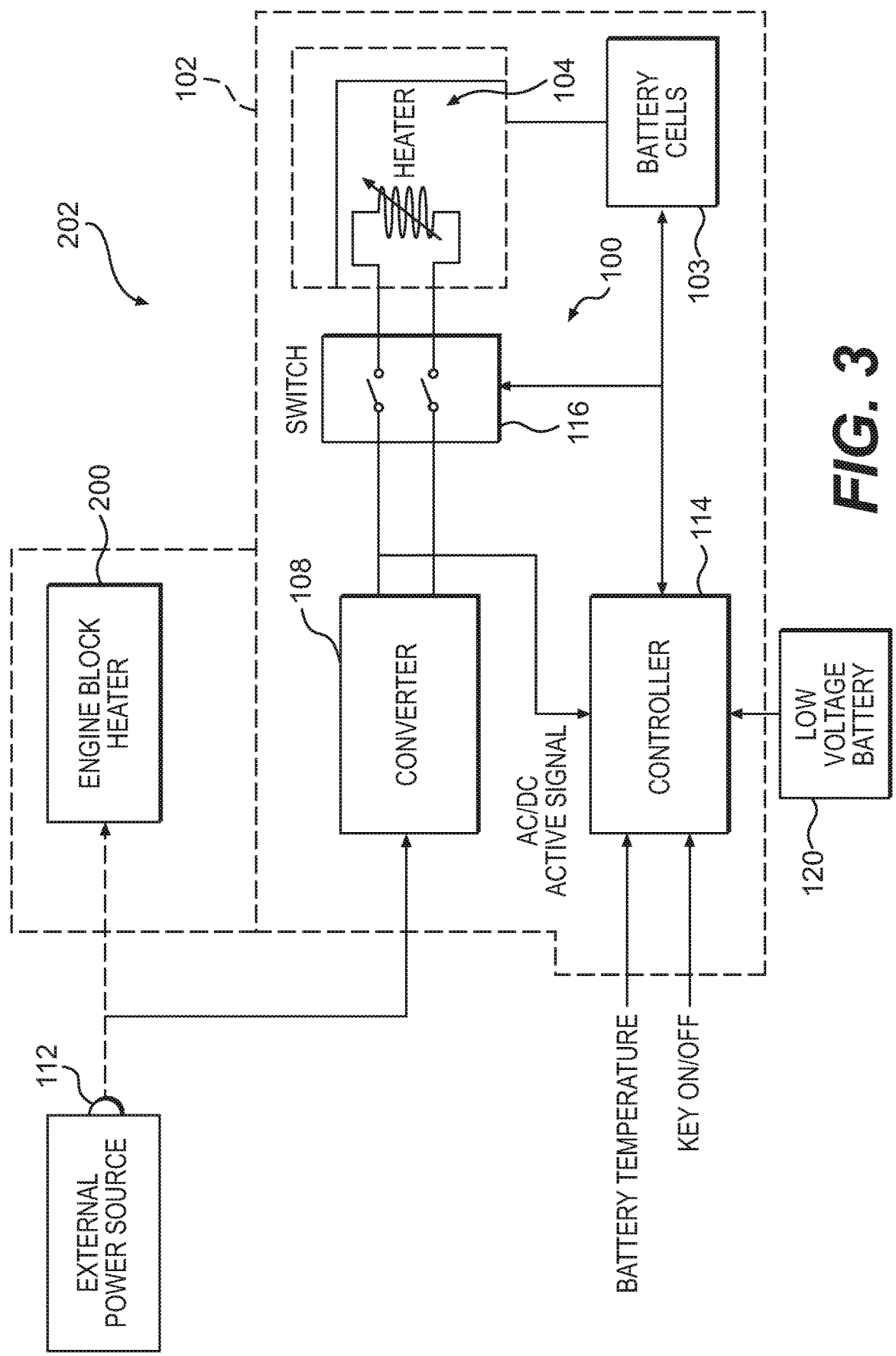
FIG. 3 is a block diagram illustrating an example of the battery heater system in conjunction with an engine block heater.

FIG. 3 illustrates the battery heater system 100 coupled with an engine block heater 200. In extremely cold regions, vehicles are typically equipped with the engine block heater 200 to keep an engine in good working condition in cold climates. Like the inventive battery heater system 100, the engine block heater 200 is designed to be connected to the AC power source 110. The modular design of the inventive battery heater system 100 allows it to be easily coupled to the engine block heater 200.

As shown in FIG. 3, both the battery heater system 100 and the engine block heater 200 may be connected to the same AC power source 110 through a single connector 112 (e.g., a single plug) as opposed to two separate connectors. The single connector 112 is appropriate because the battery heater system 100 and the engine block heater 200 are usually both needed at the same time in extremely cold climates. This streamlines the vehicle heating package 202 and simplifies connection of the battery heater system 100 and the engine block heater 200 to the AC power source 110. The battery heater system 100 and the engine block heater 200 may be offered together as a modular vehicle heating package 202.

Figure 4:
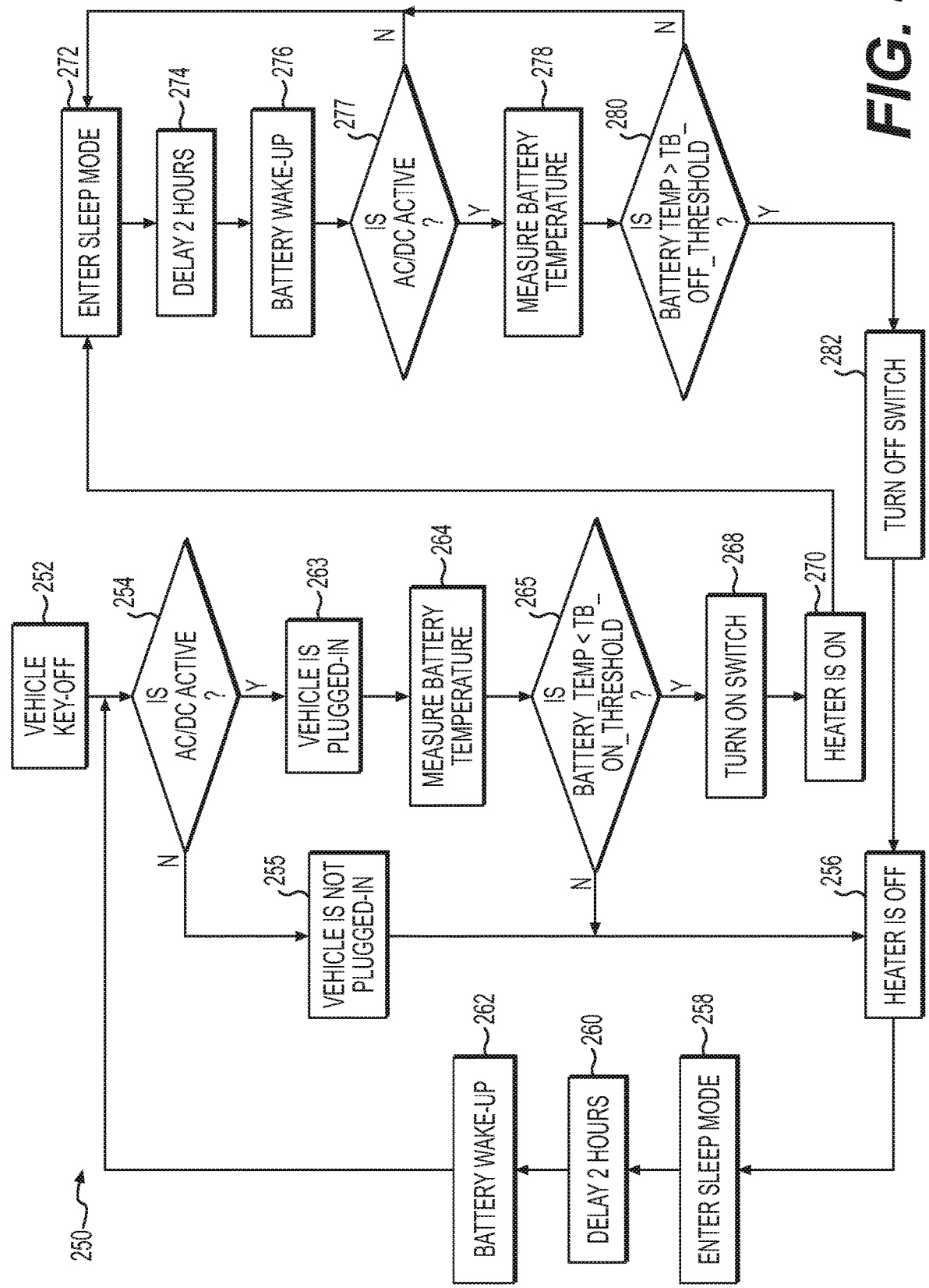
FIG. 4 is a flow diagram illustrating a method for controlling the battery heater according to one embodiment of the invention.

FIG. 4 is a flow diagram illustrating a control process 250 used by the controller 114 to control the battery temperature according to one embodiment of the invention. As noted above, the controller 114 may receive inputs corresponding to battery temperature and a key on/off condition. The controller 114 also checks whether it is receiving the AC/DC active signal to determine whether the battery heater system 100 is connected to the AC power source 110.

In the illustrated control process 250, the controller 114 assumes that the vehicle key is not in a vehicle ignition; that is, the vehicle is in a key-off condition (block 252). The controller 114 then checks whether it is receiving the AC/DC active signal (block 254). If not, the controller 114 assumes that the battery heater system 100 is not connected to the AC power source 110 (block 255) and therefore maintains the heater 104 in an OFF condition (block 256). The controller 114 then enters a sleep mode during which it is inactive. The sleep mode may, for example, reduce the current draw of the controller 114 (block 258). During this sleep mode, the controller 114 waits for a selected period of time (e.g., 2 hours) (block 260) before waking up (block 262). Note that it may be possible to operate the heater when the vehicle is in a key-on condition, if desired, as long as the battery heater system 100 is connected to the AC power source 110.

If the controller 114 is receiving the AC/DC active signal (block 254), it knows that the battery heater system 100 is connected to the AC power source 110 (block 263). The controller 114 then checks the battery temperature (block 264) to determine whether the battery temperature is less than a selected temperature threshold (block 265). As noted above, the temperature threshold is selected to ensure that the vehicle will start and/or ensure optimum vehicle performance.

If the battery temperature is at or greater than the temperature threshold, the controller 114 switches the heater 104 to the OFF condition if it is turned on or leaves the heater 104 in the OFF condition if it is already turned off (block 256). The controller 114 then enters the sleep mode (block 258) as described above, checking the battery temperature again when it wakes up after the selected time period.

If the battery temperature is less than the temperature threshold (block 265), it indicates that the battery system 102 needs to be heated to reach its desired temperature. The controller 114 turns on the switch 116 to connect the heater 104 to the AC power source 110 (block 268). At this point, the heater 104 is in the ON condition (block 270).

The controller 114 then enters a sleep mode (block 272). In this example, the amount of current sent to the heater 104 is low enough so that the heater 104 can remain turned on during the sleep mode without any danger of overheating. Alternatively, the controller 114 may turn the switch 116 on only for a predetermined period of time before turning it off again, without waiting for the controller 114 to wake up out of sleep mode. Note that if the controller 114 is powered by the AC power source 110 rather than the low-voltage battery 120, the controller 114 can monitor the battery temperature continuously rather than only during periodic wake-ups, further optimizing the battery system 102 power without risking overheating.

In the example shown in FIG. 3, the controller 114 remains in sleep mode for the selected time period (e.g., 2 hours) (block 274). The controller 114 then wakes up (block 276) and checks whether it is receiving the AC/DC active signal (block 277). If not, it re-enters the sleep mode (block 272). If the controller 114 is receiving the AC/DC active signal, indicating that the battery heater system 100 is connected to the AC power source 110, the controller 114 then measures the battery temperature (block 278). If the battery temperature is at or below the desired temperature threshold (block 280), the controller 114 re-enters the sleep mode (block 272) with the switch 116 closed, thereby allowing current to continue passing through the heater 104 and keep the heater 104 in the ON condition. Of course, if the controller 114 is no longer receiving the AC/DC signal at this stage, the controller 114 opens the switch 116 to switch the heater 104 to an OFF condition.

If the battery temperature is above the temperature threshold (block 278), it indicates that the battery system 102 is at or above the desired optimum temperature, making it unnecessary to continue operating the heater 104. The controller 114 therefore opens the switch 116 to disconnect the heater 104 from the AC power source 110 (block 282) and place the heater 104 in an OFF condition (block 256). The controller 114 then enters the sleep mode (block 258) as described above and delays for the selected time period before waking up to check the battery temperature again.

The inventive battery heater system therefore maintains a desired battery temperature indefinitely by connecting the battery heater to an AC power source rather than relying on its own internal power source. Using the AC power source also allows the battery heater system to work in conjunction with an engine block heater and be powered through the engine block heater's connection to the power source, eliminating the need for separate power source connections. The modularity of the inventive battery heater system also allows it to be included or omitted from a given vehicle easily.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A vehicle, comprising:
   a first power source located on-board said vehicle;
   a battery system powered by said first power source, wherein said battery system includes a high voltage electrical storage device, a heater that selectively heats said high voltage electrical storage device, and a switch that selectively couples said heater to said first power source; and a controller that controls the operation of said heater by actuating said switch to couple said heater to said first power source, wherein said controller is powered by an alternative power source that is separate from said first power source.

2. The vehicle as recited in claim 1, wherein said controller is configured to actuate said switch based on at least one of a temperature of said high voltage electrical storage device, an output from a converter, and a key on/off condition of said vehicle.

3. The vehicle as recited in claim 1, comprising an engine block heater that is coupled to said battery system by said first power source.

4. The vehicle as recited in claim 3, wherein said heater and said engine block heater are connected to said first power source by a single connector.

5. The vehicle as recited in claim 1, wherein said first power source is a battery separate from said battery system.

6. The system as recited in claim 1, wherein said controller is configured to actuate said heater based on a temperature of said high voltage electrical storage device and a vehicle key ON/OFF condition.

7. The system as recited in claim 1, wherein said controller is powered by a low voltage battery that is separate from either of said high voltage electrical storage device and said alternative power source from said location separate from said high voltage electrical storage device.

8. The vehicle as recited in claim 1, wherein said alternative power source is a low voltage battery.

9. A method, comprising:
checking whether a vehicle is in a key ON or key OFF condition with a controller;
connecting a heater to a high voltage electrical storage device of a battery system of the vehicle if a temperature is below a temperature threshold and the vehicle is in the key OFF condition; and
disconnecting the heater from the high voltage electrical storage device if the temperature is above the temperature threshold or the battery system is disconnected from an external power source.

10. The method as recited in claim 9, comprising periodically awakening from a sleep mode to check the temperature of the high voltage electrical storage device.

11. The method as recited in claim 10, comprising:
remaining in the sleep mode for a selected time period;
awakening from the sleep mode after the selected time period; and
rechecking whether the battery system is connected to the external power source after the step of awakening from the sleep mode.

12. The method as recited in claim 9, comprising:
checking whether the battery system is connected to the external power source; and
checking the temperature of the high voltage electrical storage device of said battery system, wherein the checking steps are performed by a controller.

13. The method as recited in claim 9, wherein connecting the heater to the high voltage electrical storage device is performed if a converter active signal indicates that the heater is connected to the external power source.

14. The method as recited in claim 9, wherein the heater includes a thermoelectric heater element.

15. A battery heater system for an electrified vehicle, comprising:
a high voltage battery system that includes a plurality of battery cells, a heater that selectively heats said plurality of battery cells, and a switch that selectively controls power flow to said heater;
a power supply separate from said high voltage battery system that selectively powers said heater when said switch is closed; and
a controller configured to control operation of said switch to supply power to said heater based on at least battery cell temperatures, a key ON/OFF condition, and a converter AC/DC active signal.

16. The battery heater system as recited in claim 15, wherein said heater includes a thermoelectric heater element.

* * * * *